United States Patent
Malavear

(10) Patent No.: US 6,575,337 B1
(45) Date of Patent: Jun. 10, 2003

(54) POURING DEVICE

(76) Inventor: Dana J. Malavear, 834 Applegate Dr., Dallas, TX (US) 75253

( * ) Notice: Subject to any disclaimer, the term of this patent is extended or adjusted under 35 U.S.C. 154(b) by 0 days.

(21) Appl. No.: 10/232,037

(22) Filed: Aug. 30, 2002

(51) Int. Cl.[7] ............................................. B67D 5/64
(52) U.S. Cl. .................................... 222/166; 248/141
(58) Field of Search ............................... 222/164, 166, 222/571; 248/141, 130, 133, 371

(56) References Cited

U.S. PATENT DOCUMENTS

| | | | |
|---|---|---|---|
| 267,191 A | * 11/1882 | Gough | .......... 222/166 |
| 285,119 A | 9/1883 | Fletcher | |
| 1,495,540 A | * 5/1924 | Van Sant | .......... 222/166 |
| 2,708,558 A | 5/1955 | Pendersen | |
| 2,813,693 A | 11/1957 | Puddicombe et al. | |
| 2,830,782 A | 4/1958 | Solberg | |
| D214,750 S | 7/1969 | Hawkinson | |
| 3,478,931 A | * 11/1969 | Lynn | .......... 222/166 |
| 4,632,009 A | * 12/1986 | Dann | .......... 86/31 |
| 5,439,142 A | 8/1995 | Robertson et al. | |

* cited by examiner

Primary Examiner—Ramon O. Ramirez

(57) ABSTRACT

A pouring device for facilitating pouring of material in a cook pot into a container. The pouring device includes a base portion being designed for resting on a support surface. The base portion is designed for receiving a container. A pair of support portions are positioned on the base portion. An axle portion is coupled between the support portions whereby the support portions support the axle portion above the base portion. The support portions are removable from the base portion to allow for easier clean up of the base portion. A pouring assembly is rotatably coupled the axle portion. The pouring assembly is designed for receiving a cook pot whereby the pouring assembly is for pouring material from the cook pot into the container positioned on the base member when the pouring assembly is rotated with respect to the base portion.

13 Claims, 3 Drawing Sheets

POURING DEVICE

BACKGROUND OF THE INVENTION

1. Field of the Invention

The present invention relates to tilting serving devices and more particularly pertains to a new pouring device for facilitating pouring of material in a cook pot into a container.

2. Description of the Prior Art

The use of tilting serving devices is known in the prior art. U.S. Pat. No. 5,439,142 describes a device for being tilted to pour liquid food stuff into a container. Another type of tilting serving device is U.S. Pat. No. 2,813,693 having a base with a holder means pivotally coupled to the base for receiving a container to be pivoted with respect to the base to allow liquids to be poured from the container. U.S. Pat. No. 2,830,782 has a drip stand for receiving a container and allowing the container to be pivoted to allow material in the container to drip out. U.S. Pat. No. 285,119 has a stand and rest for receiving a pitcher to allow the pitcher to be tilted to pour liquids from the pitcher without having to lift the pitcher. U.S. Pat. No. 2,708,558 has a holder pivotally coupled to a stand whereby the holder receives a container to permit tilting of the container to dispense the material in the container without having to lift the container. U.S. Pat. No. Des. 214,750 shows a combined carton holder and pouring stand.

While these devices fulfill their respective, particular objectives and requirements, the need remains for a device that certain improved features to allow for different sizes of cook pots to be received.

SUMMARY OF THE INVENTION

The present invention meets the needs presented above by providing a securing portion slidably coupled to a support plate to secure cook pots of different sizes between the securing portion and the retaining wall.

Still yet another object of the present invention is to provide a new pouring device that provides a handle member positioned opposite the backing wall for making sure the hand of the user is positioned away from the cook pot to prevent the hand from being burned.

Even still another object of the present invention is to provide a new pouring device that has a peripheral lip around the base member of the base portion to contain any spilled material from cook pot when the cook pot is tilted.

To this end, the present invention generally comprises a base portion being designed for resting on a support surface. The base portion is designed for receiving a container. A pair of support portions are positioned on the base portion. An axle portion is coupled between the support portions whereby the support portions support the axle portion above the base portion. The support portions are removable from the base portion to allow for easier clean up of the base portion. A pouring assembly is rotatably coupled the axle portion. The pouring assembly is designed for receiving a cook pot whereby the pouring assembly is for pouring material from the cook pot into the container positioned on the base member when the pouring assembly is rotated with respect to the base portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
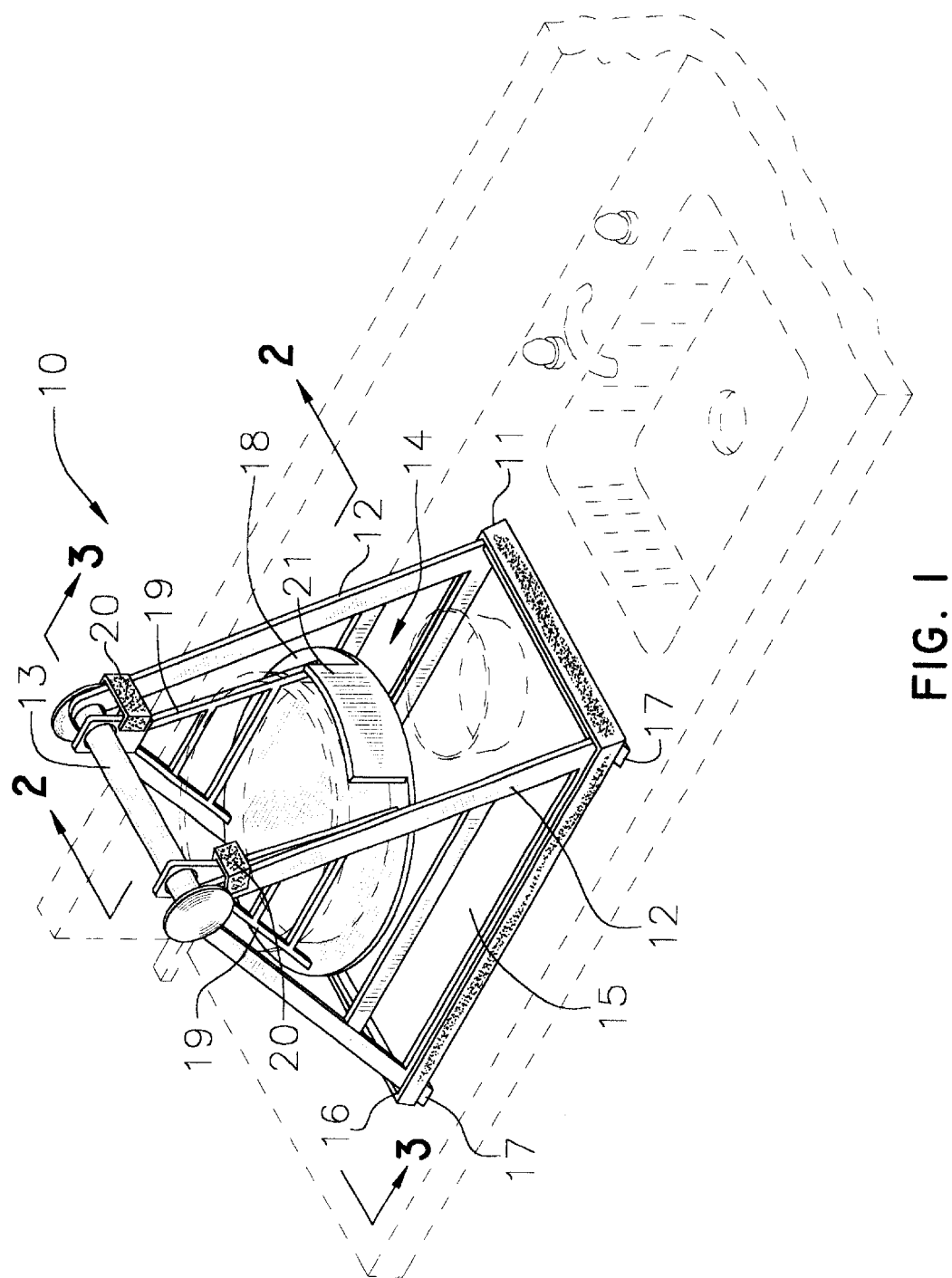
FIG. 1 is a perspective view of a new pouring device according to the present invention shown in user.
Figure 2:
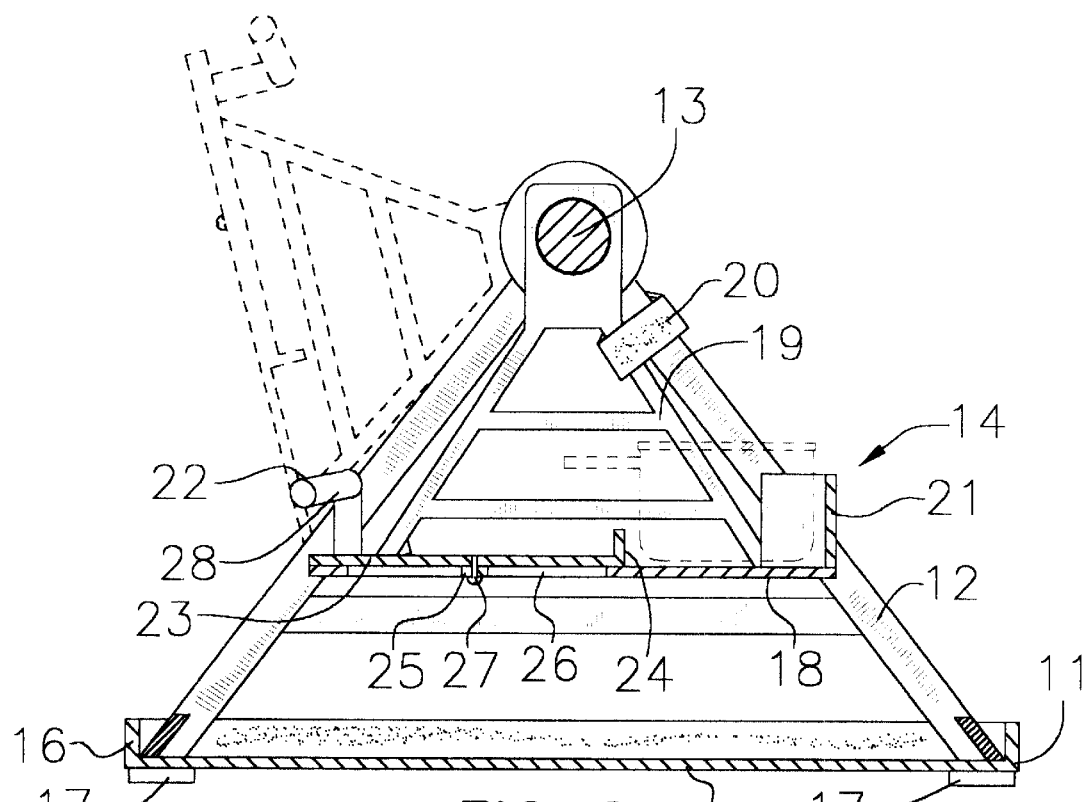
FIG. 2 is a cross-sectional view of the present invention taken along line 2—2 of FIG. 1.
Figure 3:
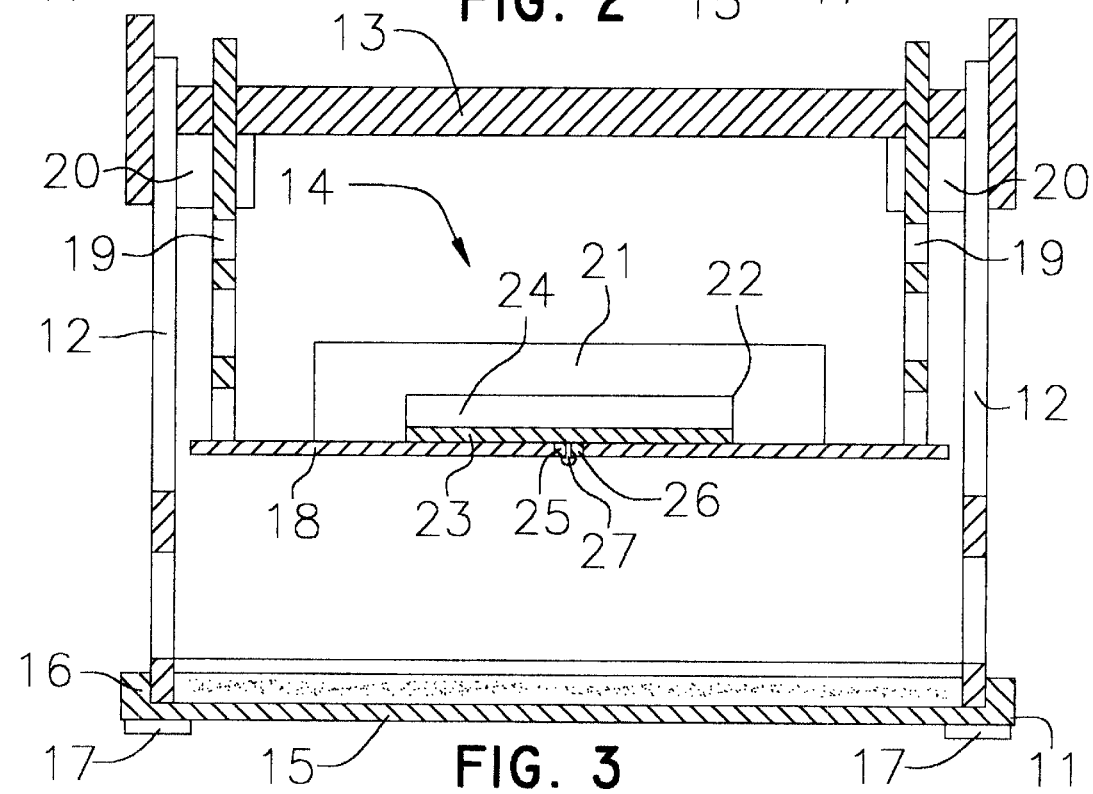
FIG. 3 is across-sectional view of the present invention taken along line 3—3 of FIG. 1.
Figure 4:
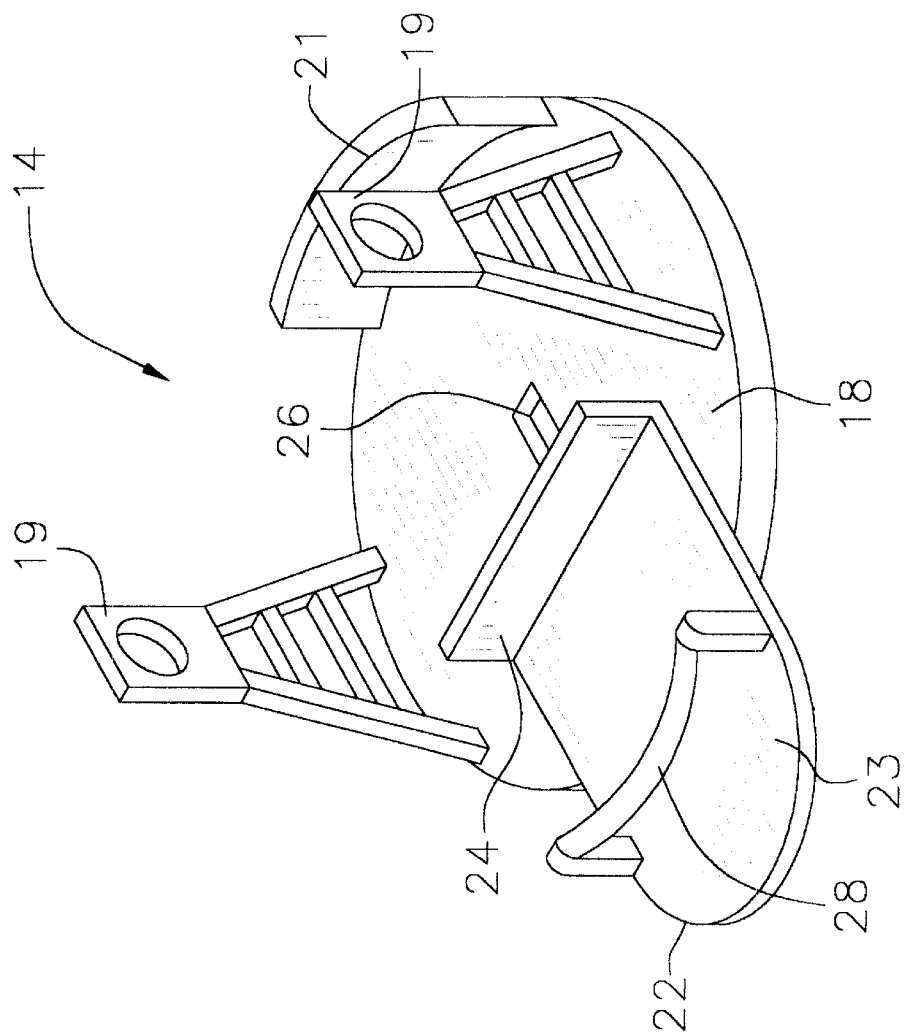
FIG. 4 is a perspective view of the pouring assembly of the present invention.

With reference now to the drawings, and in particular to FIGS. 1 through 4 thereof, a new pouring device embodying the principles and concepts of the present invention and generally designated by the reference numeral 10 will be described.

As best illustrated in FIGS. 1 through 4, the pouring device 10 generally comprises a base portion 11 being designed for resting on a support surface. The base portion 11 is designed for receiving a container.

A pair of support portions 12 are positioned on the base portion 11. An axle portion 13 is coupled between the support portions 12 whereby the support portions 12 support the axle portion 13 above the base portion 11. The support portions 12 are removable from the base portion 11 to allow for easier clean up of the base portion 11.

A pouring assembly 14 is rotatably coupled the axle portion 13. The pouring assembly 14 is designed for receiving a cook pot whereby the pouring assembly 14 is for pouring material from the cook pot into the container positioned on the base member 15 when the pouring assembly 14 is rotated with respect to the base portion 11.

The base portion 11 comprises a base member 15 and a peripheral lip 16. The peripheral lip 16 upwardly extends from a perimeter edge of the base member 15. The support portions 12 are selectively positioned on the base member 15 whereby the peripheral lip 16 abuts the support portions 12 for inhibiting the support portions 12 from sliding off of the base member 15. The peripheral lip 16 is designed for inhibiting material from the cook pot from spilling onto the support surface when the material is poured from the cook pot to the container.

A plurality of friction enhancing members 17 are coupled to the base portion 11 whereby the friction enhancing members 17 are designed for being positioned between the base portion 11 and the support surface. The friction enhancing members 17 are designed for inhibiting sliding of the base portion 11 with respect to the support surface when the base portion 11 is positioned on the support surface. The friction enhancing members 17 may comprise a rubber or other suitable material for inhibiting sliding of the base portion 11 with respect to the support surface.

The pouring assembly 14 comprises a support plate 18. The support plate 18 is pivotally coupled to the axle portion 13 whereby the support plate 18 is rotatable with respect to the base portion 11. The support plate 18 is designed for receiving the cook pot whereby the support plate 18 is for tilting the cook pot with respect to the base portion 11 when the support plate 18 is rotated with respect to the base portion 11.

The pouring assembly 14 comprises a pair of hanging supports 19. Each of the hanging supports 19 is coupled between the support plate 18 and the axle portion 13 whereby the hanging supports 19 suspend the support plate 18 between the axle portion 13 and the base portion 11. The hanging supports 19 are rotatably coupled to the axle portion 13 whereby the hanging supports 19 are for permitting the support plate 18 to be rotated with respect to the base portion 11.

At least one stopping member 20 is coupled to one of the support members. The stopping member 20 engages one of the hanging supports 19 of the pouring assembly 14 whereby the stopping member 20 is for inhibiting the pouring assembly 14 from rotating forward of the support portion for inhibiting the cook pot from sliding off the support plate 18.

The pouring assembly 14 comprises a retaining wall 21. The retaining wall 21 upwardly extends from the support plate 18 whereby the retaining wall 21 is designed for abutting against the cook pot when the cook pot is positioned on the support plate 18. The retaining wall 21 is designed for inhibiting sliding of the cook pot off of the support plate 18 when the support plate 18 is rotated with respect to the base portion 11.

The pouring assembly 14 comprises a securing portion 22. The securing portion 22 is selectively coupled to the support plate 18 of the pouring assembly 14. The securing portion 22 is designed for engaging the cook pot opposite the retaining wall 21 whereby the securing portion 22 is for inhibiting sliding of the cook pot on the support plate 18 between the retaining wall 21 and the securing portion 22 when the support plate 18 is being rotated with respect to the base portion 11.

The securing portion 22 comprises a bottom plate 23 and a backing wall 24. The backing wall 24 upwardly extends from a peripheral edge of the bottom plate 23. The bottom plate 23 is slidably coupled to the support plate 18 whereby the backing wall 24 is designed for abutting against the cook pot for forcing the cook pot against the retaining wall 21 of the pouring assembly 14 when the bottom plate 23 is slid with respect to the support plate 18.

The securing portion 22 comprises a positioning tab 25. The positioning tab 25 downwardly extends from the bottom plate 23 whereby the positioning tab 25 is slidably positioned in a slot 26 extending through the support plate 18. The positioning tab 25 is for maintaining positioning of the securing portion 22 with respect to the support plate 18 when the support plate 18 is being rotated with respect to the base portion 11.

The securing portion 22 comprises a locking member 27. The locking member 27 is selectively coupled to the positioning tab 25. The locking member 27 is for securing the positioning tab 25 and the bottom plate 23 to the support plate 18 to selectively inhibit sliding of the bottom plate 23 with respect to the bottom plate 23 when the bottom plate 23 has been slid into a desired position.

The securing portion 22 comprises a handle member 28. The handle member 28 is coupled to the peripheral edge of the bottom plate 23 whereby the handle member 28 is positioned opposite the backing wall 24. The handle member 28 is designed for being gripped by a hand of the user for facilitating rotation of the support plate 18 with respect to the base portion 11 when the user wishes to pour material from the cook pot into the container.

In use, the user places the support portions 12 onto the base portion 11 inside of the peripheral lip 16 of the base portion 11. The cook pot is then placed on the support plate 18 with a front portion of the cook pot abutting the retaining wall 21. The bottom plate 23 is then slid with respect to the support plate 18 so that the backing plate abuts the cook pot and forces the cook pot against the retaining wall 21. The locking member 27 is the engaged by the user to secure the bottom plate 23 to the support plate 18. The user can then grip the handle member 28 and pull back to tip the cook pot to pour material in the cook pot into the container.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pouring device for facilitating pouring of material from a cook pot into a container, the pouring device comprising:

a base portion being adapted for resting on a support surface, said base portion being adapted for receiving the container;

a pair of support portions being positioned on said base portion;

an axle portion being coupled between said support portions such that said support portions support said axle portion above said base portion; and a pouring assembly being rotatably coupled said axle portion, said pouring assembly comprising a support plate pivotally coupled to said axle portion, and being adapted for receiving a cook pot such that said pouring assembly is for pouring material from the cook pot into the container positioned on said base member when said pouring assembly is rotated with respect to said base portion.

2. The pouring device as set forth in claim 1, further comprising:

said base portion comprising a base member and a peripheral lip, said peripheral lip upwardly extending from a perimeter edge of said base member, said support portions being selectively positioned on said base member such that said peripheral lip abuts said support portions for inhibiting said support portions from sliding off of said base member, said peripheral lip being adapted for inhibiting material from the cook pot from spilling onto the support surface when the material is poured from the cook pot to the container.

3. The pouring device as set forth in claim 1, further comprising:

a plurality of friction enhancing members being coupled to said base portion such that said friction enhancing members are adapted for being positioned between said base portion and the support surface, said friction enhancing members being adapted for inhibiting sliding of said base portion with respect to the support surface when said base portion is positioned on the support surface.

4. The pouring device as set forth in claim 1, wherein:

said support plate is for tilting the cook pot with respect to said base portion when said support plate is rotated with respect to said base portion.

5. The pouring device as set forth in claim 4, further comprising:

said pouring assembly comprising a pair of hanging supports, each of said hanging supports being coupled between said support plate and said axle portion such that said hanging supports suspend said support plate between said axle portion and said base portion, said hanging supports being rotatably coupled to said axle portion such that said hanging supports are for permitting said support plate to be rotated with respect to said base portion.

6. The pouring device as set forth in claim 5, further comprising:

at least one stopping member being coupled to one of said support members, said stopping member engaging one of said hanging supports of said pouring assembly such that said stopping member is for inhibiting said pouring assembly from rotating forward of said support portion for inhibiting the cook pot from sliding off said support plate.

7. The pouring device as set forth in claim 4, further comprising:

said pouring assembly comprising a retaining wall, said retaining wall upwardly extending from said support plate such that said retaining wall is adapted for abutting against the cook pot when the cook pot is positioned on said support plate, said retaining wall being adapted for inhibiting sliding of the cook pot off of said support plate when said support plate is rotated with respect to said base portion.

8. The pouring device as set forth in claim 7, further comprising:

said pouring assembly comprising a securing portion, said securing portion being selectively coupled to said support plate of said pouring assembly, said securing portion being adapted for engaging the cook pot opposite said retaining wall such that said securing portion is for inhibiting sliding of the cook pot on said support plate between said retaining wall and said securing portion when said support plate is being rotated with respect to said base portion.

9. The pouring device as set forth in claim 8, further comprising:

said securing portion comprising a bottom plate and a backing wall, said backing wall upwardly extending from a peripheral edge of said bottom plate, said bottom plate being slidably coupled to said support plate such that said backing wall is adapted for abutting against the cook pot for forcing said cook pot against said retaining wall of said pouring assembly when said bottom plate is slid with respect to said support plate.

10. The pouring device as set forth in claim 9, further comprising:

said securing portion comprising a positioning tab, said positioning tab downwardly extending from said bottom plate such that said positioning tab is slidably positioned in a slot extending through said support plate, said positioning tab being for maintaining positioning of said securing portion with respect to said support plate when said support plate is being rotated with respect to said base portion.

11. The pouring device as set forth in claim 10, further comprising:

said securing portion comprising a locking member, said locking member being selectively coupled to said positioning tab, said locking member being for securing said positioning tab and said bottom plate to said support plate to selectively inhibit sliding of said bottom plate with respect to said bottom plate when said bottom plate has been slid into a desired position.

12. The pouring device as set forth in claim 9, further comprising:

said securing portion comprising a handle member, said handle member being coupled to said peripheral edge of said bottom plate such that said handle member is positioned opposite said backing wall, said handle member being adapted for being gripped by a hand of the user for facilitating rotation of said support plate with respect to said base portion when the user wishes to pour material from the cook pot into the container.

13. A pouring device for facilitating pouring of material from a cook pot into a container, the pouring device comprising:

a base portion being adapted for resting on a support surface, said base portion being adapted for receiving the container;

a pair of support portions being positioned on said base portion;

an axle portion being coupled between said support portions such that said support portions support said axle portion above said base portion;

a pouring assembly being rotatably coupled said axle portion, said pouring assembly being adapted for receiving a cook pot such that said pouring assembly is for pouring material from the cook pot into the container positioned on said base member when said pouring assembly is rotated with respect to said base portion;

said base portion comprising a base member and a peripheral lip, said peripheral lip upwardly extending from a perimeter edge of said base member, said support portions being selectively positioned on said base member such that said peripheral lip abuts said support portions for inhibiting said support portions from sliding off of said base member, said peripheral lip being adapted for inhibiting material from the cook pot from spilling onto the support surface when the material is poured from the cook pot to the container;

a plurality of friction enhancing members being coupled to said base portion such that said friction enhancing members are adapted for being positioned between said base portion and the support surface, said friction enhancing members being adapted for inhibiting sliding of said base portion with respect to the support surface when said base portion is positioned on the support surface;

said pouring assembly comprising a support plate, said support plate being pivotally coupled to said axle portion such that said support plate is rotatable with respect to said base portion, said support plate being adapted for receiving the cook pot such that said support plate is for tilting the cook pot with respect to said base portion when said support plate is rotated with respect to said base portion;

said pouring assembly comprising a pair of hanging supports, each of said hanging supports being coupled between said support plate and said axle portion such that said hanging supports suspend said support plate between said axle portion and said base portion, said hanging supports being rotatably coupled to said axle portion such that said hanging supports are for permitting said support plate to be rotated with respect to said base portion;

at least one stopping member being coupled to one of said support members, said stopping member engaging one of said hanging supports of said pouring assembly such that said stopping member is for inhibiting said pouring assembly from rotating forward of said support portion for inhibiting the cook pot from sliding off said support plate;

said pouring assembly comprising a retaining wall, said retaining wall upwardly extending from said support plate such that said retaining wall is adapted for abutting against the cook pot when the cook pot is positioned on said support plate, said retaining wall being adapted for inhibiting sliding of the cook pot off of said support plate when said support plate is rotated with respect to said base portion;

said pouring assembly comprising a securing portion, said securing portion being selectively coupled to said support plate of said pouring assembly, said securing portion being adapted for engaging the cook pot opposite said retaining wall such that said securing portion is for inhibiting sliding of the cook pot on said support plate between said retaining wall and said securing portion when said support plate is being rotated with respect to said base portion;

said securing portion comprising a bottom plate and a backing wall, said backing wall upwardly extending from a peripheral edge of said bottom plate, said bottom plate being slidably coupled to said support plate such that said backing wall is adapted for abutting against the cook pot for forcing said cook pot against said retaining wall of said pouring assembly when said bottom plate is slid with respect to said support plate;

said securing portion comprising a positioning tab, said positioning tab downwardly extending from said bottom plate such that said positioning tab is slidably positioned in a slot extending through said support plate, said positioning tab being for maintaining positioning of said securing portion with respect to said support plate when said support plate is being rotated with respect to said base portion;

said securing portion comprising a locking member, said locking member being selectively coupled to said positioning tab, said locking member being for securing said positioning tab and said bottom plate to said support plate to selectively inhibit sliding of said bottom plate with respect to said bottom plate when said bottom plate has been slid into a desired position; and said securing portion comprising a handle member, said handle member being coupled to said peripheral edge of said bottom plate such that said handle member is positioned opposite said backing wall, said handle member being adapted for being gripped by a hand of the user for facilitating rotation of said support plate with respect to said base portion when the user wishes to pour material from the cook pot into the container.

* * * * *